United States Patent [19]
Stecker

[11] Patent Number: 5,966,895
[45] Date of Patent: Oct. 19, 1999

[54] NON-CORROSIVE REINFORCING MEMBER HAVING BENDABLE FLANGES

[75] Inventor: William M. Stecker, Chapel Hill, N.C.

[73] Assignee: Surface Technologies, Inc., Durham, N.C.

[21] Appl. No.: 09/302,972

[22] Filed: Apr. 30, 1999

Related U.S. Application Data

[62] Division of application No. 09/123,372, Jul. 27, 1998.

[51] Int. Cl.$^6$ ....................................................... E04C 5/00
[52] U.S. Cl. ........................ 52/740.1; 52/740.3; 52/740.4; 52/730.2; 52/649.1
[58] Field of Search .............................. 52/740.1, 740.3, 52/740.4, 730.2, 649.1, 414, 251, 85; D25/119, 120, 121, 123, 125

[56] References Cited

U.S. PATENT DOCUMENTS

| | | |
|---|---|---|
| 832,711 | 10/1906 | Weber . |
| 911,062 | 2/1909 | McMullin . |
| 1,100,742 | 6/1914 | Kane . |
| 1,315,661 | 9/1919 | Goldie . |
| 1,317,824 | 10/1919 | Royse . |
| 2,113,322 | 4/1938 | Henderich .............................. 52/740.1 |
| 3,136,054 | 6/1964 | Palmer et al. . |
| 3,494,164 | 2/1970 | Rehm et al. . |
| 4,300,321 | 11/1981 | Preis et al. .......................... 52/740.1 X |
| 4,419,400 | 12/1983 | Hindersinn . |
| 4,791,772 | 12/1988 | Potucek . |
| 4,899,515 | 2/1990 | Potucek . |
| 5,540,797 | 7/1996 | Wilson . |
| 5,567,374 | 10/1996 | Thicthener et al. . |
| 5,580,642 | 12/1996 | Okamoto et al. . |
| 5,593,536 | 1/1997 | Kaiser . |
| 5,611,190 | 3/1997 | Van Merksteijn . |
| 5,613,334 | 3/1997 | Petrina . |
| 5,626,700 | 5/1997 | Kaiser . |
| 5,650,109 | 7/1997 | Kaiser et al. . |
| 5,727,357 | 3/1998 | Arumugasaamy et al. ........... 52/740.1 |

FOREIGN PATENT DOCUMENTS

| | | |
|---|---|---|
| 000805711A | 5/1951 | Germany . |
| 687085 B | 3/1965 | Italy ....................................... 52/740.1 |
| 5660 | 3/1916 | United Kingdom ................... 52/740.1 |
| 1031180 | 5/1966 | United Kingdom . |

Primary Examiner—Christopher T. Kent
Assistant Examiner—Brian E. Glessner
Attorney, Agent, or Firm—Myers Bigel Sibley & Sajovec, P.A.

[57] ABSTRACT

Non-corrosive concrete reinforcing members are formed by pultruding reinforcing fibers through resin to produce an elongated core and a plurality of elongated flanges extending radially outward from the core. A slot is formed through a portion of the elongated core such that each flange has a free inner edge adjacent the slot. The reinforcing member is thereby bendable along the slot in a direction transverse to the elongated core.

8 Claims, 8 Drawing Sheets

NON-CORROSIVE REINFORCING MEMBER HAVING BENDABLE FLANGES

RELATED APPLICATION

This application is a Divisional application of pending U.S. patent application Ser. No. 09/123,372 filed on Jul. 27, 1998.

FIELD OF THE INVENTION

The present invention relates generally to reinforced composite articles and, more particularly, to reinforced composite articles for strengthening concrete.

BACKGROUND OF THE INVENTION

Concrete and other masonry or cementitious materials have high compressive strength, but relatively low tensile strength. When concrete is employed as a structural member, such as in a building, bridge, pipe, pier, culvert, or the like, it is conventional to incorporate reinforcing members to enhance the tensile strength of the structure. Historically, the reinforcing members are steel or other metal reinforcing rods or bars, i.e., "rebar". Such reinforcing members may be placed under tension to form prestressed concrete structures.

Although steel and other metals can enhance the tensile strength of a concrete structure, they are susceptible to oxidation. For example, ferrous metal rusts by the oxidation thereof to the corresponding oxides and hydroxides of iron by atmospheric oxygen in the presence of water. When it is poured, concrete is normally at a pH of 12 to 14 (i.e., at high alkalinity) due to the presence of hydroxides of sodium, potassium, and calcium formed during the hydration of the concrete. As long as a pH in this range is maintained, steel within the concrete is passive, which may result in long-term stability and corrosion resistance.

Exposure to a strong acid, or otherwise lowering the pH of concrete, can cause steel contained in concrete to become corroded. For example, chlorine ions permeating into the concrete can cause corrosion. Sources of chlorine ions include road salt, salt air in marine environments, and salt-contaminated aggregate (e.g., sand) used in making the concrete. When the reinforcing steel corrodes, it can expand and create internal stresses in the concrete. These internal stresses can lead to cracking, and ultimately disintegration, of the concrete. Moreover, cracking and crumbling concrete may expose additional steel to atmospheric oxygen, water, and sources of chlorine ions.

Various solutions to the corrosion problem of steel rebar have been offered. Non-corrosive coatings on the concrete, the steel rebar, or both have been proposed. For example, U.S. Pat. No. 5,271,193 to Olsen et al. proposes a steel-reinforced concrete product, such as a manhole cover, having a coating of a corrosion-resistant gel coat layer and an intermediate layer of fiberglass between the concrete and the gel coat layer. The gel coat layer is described as being a "hardenable polymeric fluid material." U.S. Pat. No. 4,725,491 to Goldfein proposes steel rebar members having chemical conversion iron oxide coatings, such as black iron oxide. U.S. Pat. No. 5,100,738 to Graf proposes steel rebar having an outer layer of a synthetic material (e.g., epoxy resin) and an intermediate layer of aluminum or aluminum alloy between the outer layer and the steel. Unfortunately, in general these exemplary coatings tend to be expensive and have received mixed results and acceptance.

There has also been interest in replacing steel with various fiber-reinforced resins. For example, U.S. Pat. No. 5,580, 642 to Okamoto et al. proposes a reinforcing member for civil and architectural structures made from a mixture of reinforcing fibers and thermoplastic fibers. U.S. Pat. No. 5,613,334 to Petrina proposes a non-metallic laminated composite reinforcing rod for use in reinforced or pre-stressed concrete. A corrosion-resistant fiber-reinforced rebar, disclosed in U.S. Pat. No. 5,650,109 to Kaiser et al. comprises a fiber reinforced thermoset core and an outer cladding formed of sheet molding compound (SMC). These materials are formed into rebar through modified pultrusion processes.

Some rebar components are desirably curved or bent in order to follow the contour of the surrounding concrete structures. Unfortunately, rebar formed from fiber-reinforced resins may be difficult to bend in the field without causing the rebar to crack or break. Forming non-linear articles via pultrusion processes may also be troublesome. Because pultrusion involves pulling material through an elongated heated die which at least partially cures, and therefore stiffens, the pultruded article, establishing bends or curves-in the articles without sacrificing the advantages provided by pultrusion may be problematic.

SUMMARY OF THE INVENTION

It is therefore an object of the present invention to provide non-corrosive reinforcing members for use within concrete structures.

It is also an object of the present invention to provide non-corrosive reinforcing members for use within concrete structures that provide increased concrete strength.

It is another object of the present invention to provide non-corrosive reinforcing members that can be easily bent in the field without cracking or breaking.

These and other objects of the present invention are provided by a non-corrosive reinforcing member formed by pultruding reinforcing fibers through resin and having an elongated core, a plurality of elongated flanges extending radially outward from the core, and a slot formed through a portion of the elongated core such that each flange has a free inner edge adjacent the slot. The reinforcing member is thereby bendable along the slot in a direction substantially transverse to the elongated core. The flanges are preferable equidistantly spaced around the core. Additionally, the outer edge of each flange is preferably parallel with the longitudinal direction of the elongate core.

At least one of the flange faces may have a non-planar surface portion for improving concrete adhesion thereto. The non-planar surface portion may be added during or after pultrusion operations. In addition, the outer edge portion of a flange may be thicker than the other portions of the flange. The elongated core may also have the same or smaller thickness than a flange.

Each flange typically has a constant, thin cross section with a thicker section along its outer edge portion. A rod can have any number of flanges, but an even number (i.e., 4, 6, 8, etc.) is preferred. In addition, each flange preferably has a non-planar surface which facilitates concrete adhesion to the surface of each flange. An important aspect of the invention is that the elongated core has a cross-sectional dimension about the same (or less) as each flange.

Reinforcing members according to the present invention are designed to be bent by hand by workers in the field and without the need for large and complex bending tools. To facilitate bending, a slot is formed along the elongated core at locations where bends are desired. When the reinforcing member is bent, the flanges fold down on each other because of the unrestrained inner edge created by the slot. The reinforcing member may be held in this position by various methods, such as by using adhesive, by tying down, etc. Slots can be made either during manufacturing or later in the field.

Reinforcing members according to the present invention may be fabricated by the following operations: impregnating reinforcing fibers by pultruding them through a bath of resin material; forming the impregnated reinforcing fibers into an elongated core having a plurality of elongated flanges extending radially outward therefrom, each flange having opposite faces terminating at an outer edge; and forming a slot through a portion of the elongated core such that each of the flanges has a free inner edge adjacent the slot. The impregnated reinforcing fibers are preferably heated as they pass through a shaping die. Prior to full curing, portions of one or more flange faces may be embossed to provide non-planar surface portions thereon for improving concrete adhesion.

According to another aspect of the present invention, a reinforcing member has a central core member and a plurality of longitudinally spaced-apart flanges. The central core member has a plurality of radially spaced slots formed therein along the longitudinal direction thereof. Flanges are connected to the central core member via the slots. Because the flanges are longitudinally separated by gaps, the reinforcing member can be bent at any of these gaps, without the need for slots formed within the central core member.

The present invention is advantageous because non-corrosive reinforcing members having the same cross-sectional area as round rebar can be manufacturing with more surface area than the corresponding round rebar, with more strength. Furthermore, reinforcing members manufactured according to the present invention, can be bent by hand in the field, thereby decreasing the time required to install the reinforcing members prior to pouring concrete.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
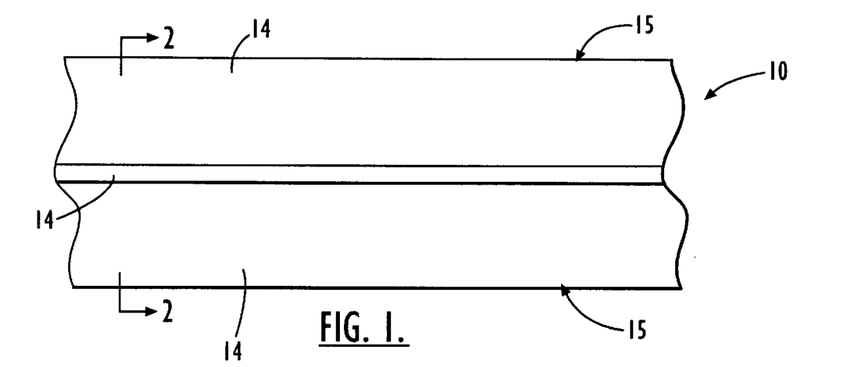
FIG. 1 is a side view of four-flanged reinforcing member according to one embodiment of the present invention.
Figures 2, 3A, 3B, 4:
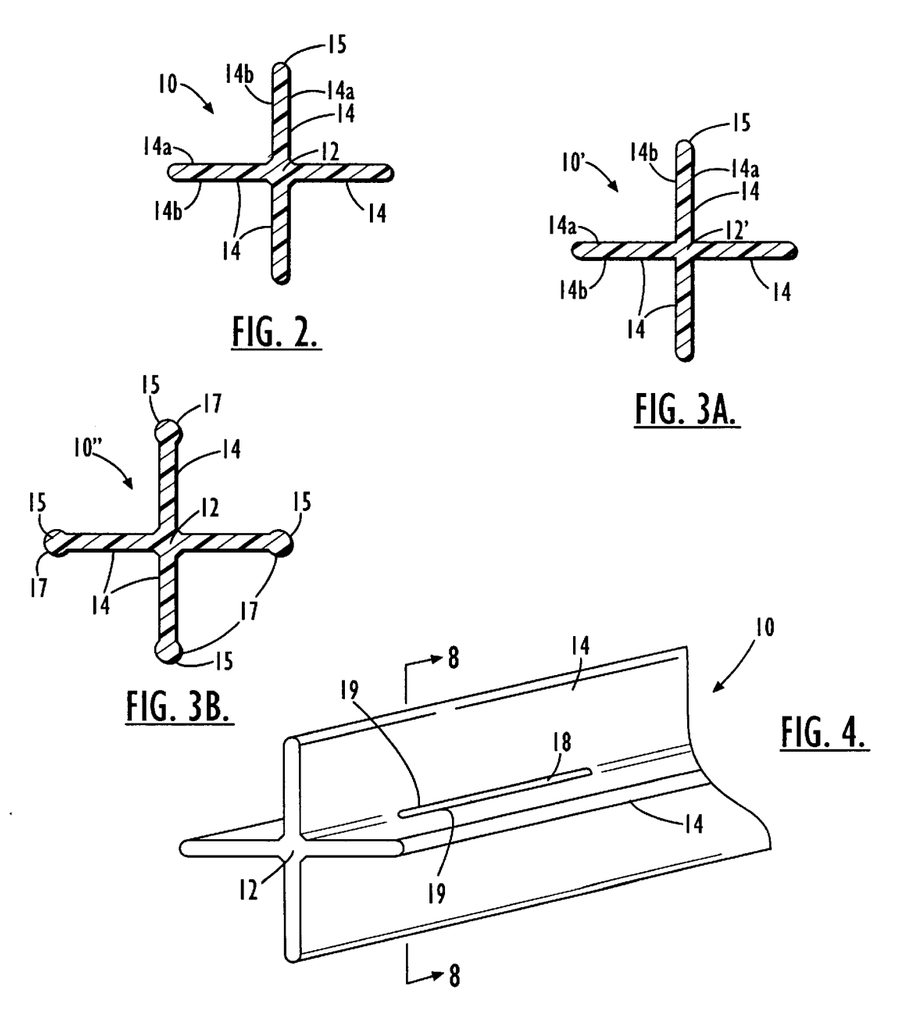
FIG. 2 is a cross-sectional view of the reinforcing member of FIG. 1, taken along lines 2—2.
FIG. 3A is a cross-sectional view of a four-flanged reinforcing member having a smaller central core than the reinforcing member of FIG. 2.
FIG. 3B is a cross-sectional view of the four-flanged reinforcing member of FIG. 2 having enlarged flange edge portions
FIG. 4 is a perspective view of the four-flange reinforcing member of FIG. 1 having a slot formed through a portion of the central core.

Referring now to FIGS. 1 and 2, a non-corrosive, composite reinforcing member 10 formed from reinforcing fibers and curable resin material, according to an embodiment of the present invention, is illustrated. The illustrated reinforcing member 10 includes an elongated core 12 having a plurality of elongated flanges 14 extending radially outward therefrom. Each flange 14 has opposite faces 14a, 14b which terminate at an outer edge 15. The illustrated reinforcing member has four flanges 14 arranged substantially equidistantly around the elongated core 12 to define a cross-section having a "cross-shaped" configuration.

However, it is to be understood that different numbers and configurations of flanges may be utilized without departing from the spirit and intent of the present invention. For example, referring to FIG. 5, a reinforcing member 11 according to another embodiment of the present invention may have six flanges 14 arranged around an elongated core 12 as illustrated. The present invention is not limited to reinforcing members having an even number of flanges or to flanges arranged equidistantly around a core.

Preferably, the reinforcing fibers in the reinforcing member 10 are unidirectional. Unidirectional fibers should be oriented to be substantially parallel with the longitudinal direction of the elongated core 12. In this configuration, the fibers can enhance the tensile and flexural strength and rigidity of the reinforcing member 10. In addition, it is preferred that unidirectional fibers are located along the surface of each flange. By having fibers along the surface of a flange, contact can be made directly between the concrete and the fibers. Contact between the concrete and the fibers increases the strength of the reinforcing member. Accordingly, the more fibers at the surfaces of each flange, the stronger the reinforcing member is within concrete. A fibrous mat is also contemplated.

Referring now to FIG. 3A, another embodiment of the present invention is illustrated. The four-flanged reinforcing member 10' of FIG. 3A has a similar configuration to the reinforcing member 10 illustrated in FIG. 2. However, the elongated core 10' of reinforcing member 10' in FIG. 3A has a cross-sectional dimension less than or equal to a cross sectional dimension of any of its respective flanges.

Preferably, the flanges of reinforcing members manufactured according to the present invention have relatively thin cross-section dimensions (i.e., thickness). Listed below in Table 1 are exemplary cross-section dimensions for various sizes of flanges. Flange size is measured from the core of the reinforcing member to the outer edge of a flange (i.e., the width of the flange).

TABLE 1

| Flange Width | Flange Thickness |
|---|---|
| 2.25 inches | 0.098 inch |
| 2.0 inches | 0.075 inch |
| 1.625 inches | 0.060 inch |
| 0.50 inch | 0.050 inch |

The thin cross section of each flange creates a high modulus to volume ratio in plane with the width of each flange. Furthermore, reinforcing members having a flanged configuration according to the present invention have greater surface area than convention round rebar of the same cross-sectional area. This is set forth in Table 2 below.

TABLE 2

| | Size | Cross-Sect. Area | Surface Area |
|---|---|---|---|
| Flanged | 2.25" × 2.25" | .44 in$^2$ | 9.39 in$^2$ |
| Round | 0.75" OD | .44 in$^2$ | 2.36 in$^2$ |
| Flanged | 2.0" × 2.0" | .31 in$^2$ | 8.3 in$^2$ |
| Round | 0.625" OD | .31 in$^2$ | 1.96 in$^2$ |
| Flanged | 1.625" × 1.625" | .25 in$^2$ | 6.74 in$^2$ |
| Round | 0.50" OD | .25 in$^2$ | 1.57 in$^2$ |
| Flanged | 0.50" × 0.50" | .11 in$^2$ | 4.2 in$^2$ |
| Round | 0.375" OD | .11 in$^2$ | 1.17 in$^2$ |

In contrast with round rebar, more surface area is available for concrete to adhere to using flanged reinforcing members according to the present invention.

Referring now to FIG. 3B, another embodiment of the present invention is illustrated. The four-flanged reinforcing member 10" of FIG. 3B has a similar configuration to the reinforcing member 10 illustrated in FIG. 2. However, flange portions 17 adjacent the outer edges 15 of each flange have a greater cross-sectional dimension (i.e., are thicker) than the remainder of each respective flange 14. By increasing the thickness of a flange towards the outer edge thereof, there is provided additional surface area for concrete to adhere to, thus increasing the strength of the concrete. Flanges may have various thickness at various locations without departing from the spirit and intent of the present invention.

Figure 8:
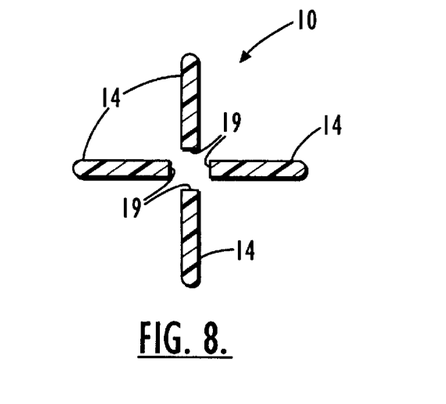
FIG. 8 is a cross-sectional view of the four-flanged reinforcing member of FIG. 4 taken along lines 8—8 and illustrating a bending slot between each flange and the reinforcing member core.

Referring now to FIG. 4, a slot 18 may formed through a portion of the elongated core 12 of the reinforcing member 10 such that each flange has a free inner edge 19 adjacent the slot 18. FIG. 8 is a cross-sectional view of the reinforcing member in FIG. 4 clearly showing that each flange has a free inner edge 19 adjacent the slot 18. The slot 18 may be formed by cutting the elongated core 12 between each pair of adjacent flanges 14 using various known techniques. The slot 18 may be formed during fabrication of the reinforcing member 10, immediately after fabrication, or in the field prior to installation. It is to be understood, however, that the reinforcing member 10 need not have a slot formed through the elongated core 12. When there is no need to bend the reinforcing member, there is no need for a slot. Accordingly, straight sections of reinforcing members, according to the present invention, may be utilized without having slots.

Figure 9:
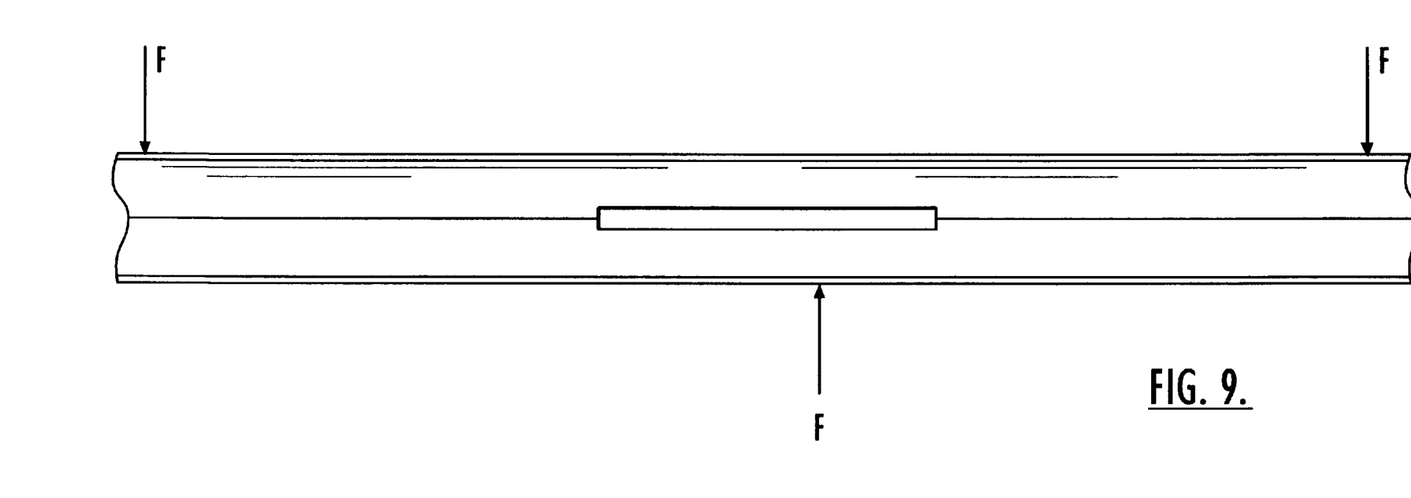
FIG. 9 is a side view of a four-flanged reinforcing member about to be bent about a bending slot between each flange and the reinforcing member core.
Figures 10, 11:
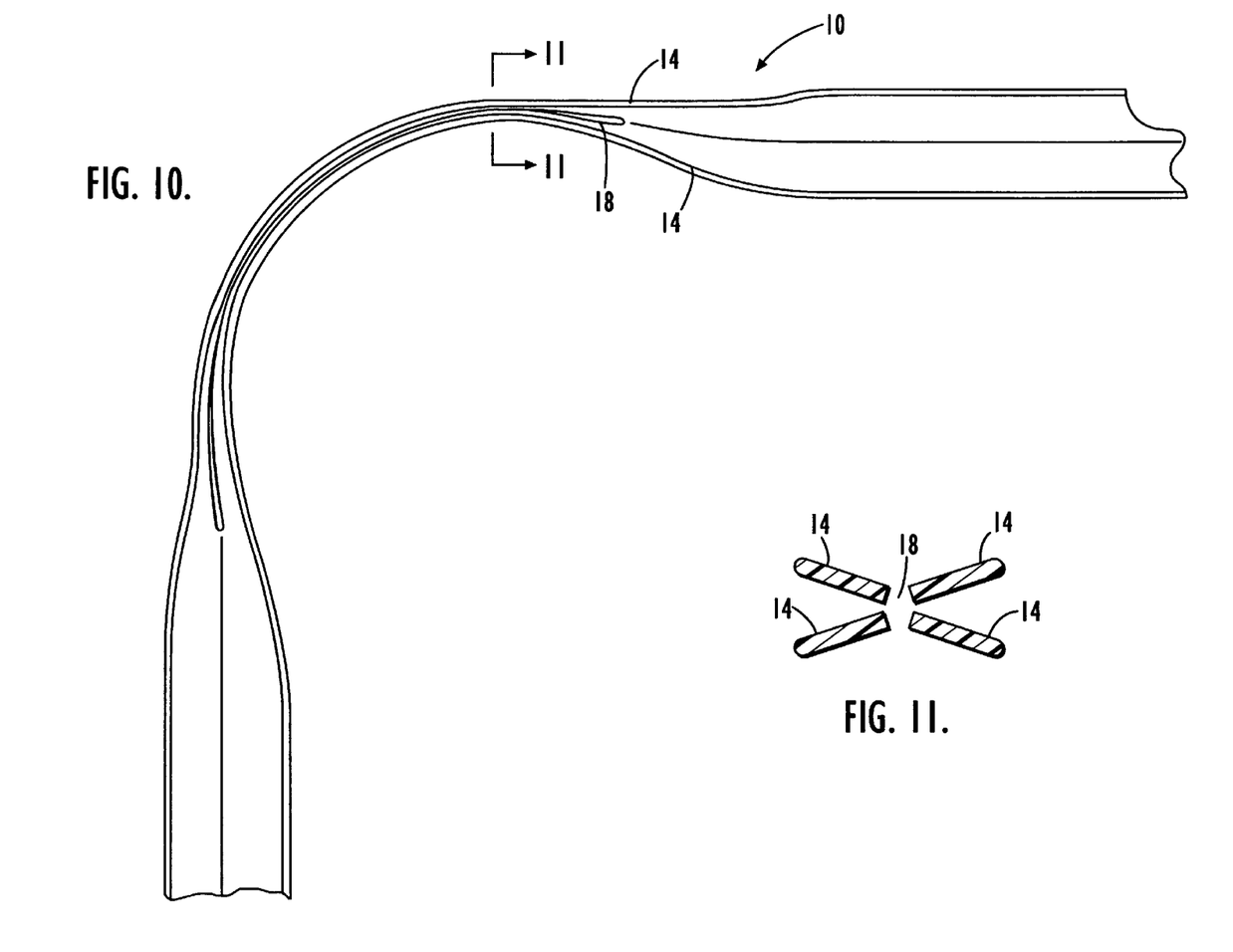
FIG. 10 is a side view of four-flanged reinforcing member according to the present invention bent about 90°.
FIG. 11 is a cross-sectional view of the reinforcing member of FIG. 10 taken along lines 11—11.

By forming a slot 18 in the elongated core 12, each flange has a free inner edge 19 that is unrestrained when the reinforcing member 10 is subjected to bending forces. When the reinforcing member 10 is subjected to bending forces, as illustrated in FIGS. 9 and 10, the flanges 14 fold down on each other and permit a portion of the reinforcing member to be bent in a direction transverse to the longitudinal direction of the core 12. Because the flanges 14 are free to fold down, the reinforcing member 10 has a generally flat configuration that allows it to be bent.

As shown in FIG. 11, the four-flanged reinforcing member 10 has two pair of folded flanges 14. Similarly for reinforcing member having even-numbered flanges, one-half of the total number of flanges will be folded together along one side of the reinforcing member and the other half will be folded together along the opposite side.

Reinforcing members according to the present invention may be bent by hand in the field without requiring the use of bending tools and the like. The reinforcing member 10 can be held in a desired bent configuration by various methods known to those skilled in this art, including but not limited to, adhesives, wires ties, and the like. Slots can be provided in various lengths and at various locations along the elongated core 12.

Figure 6:
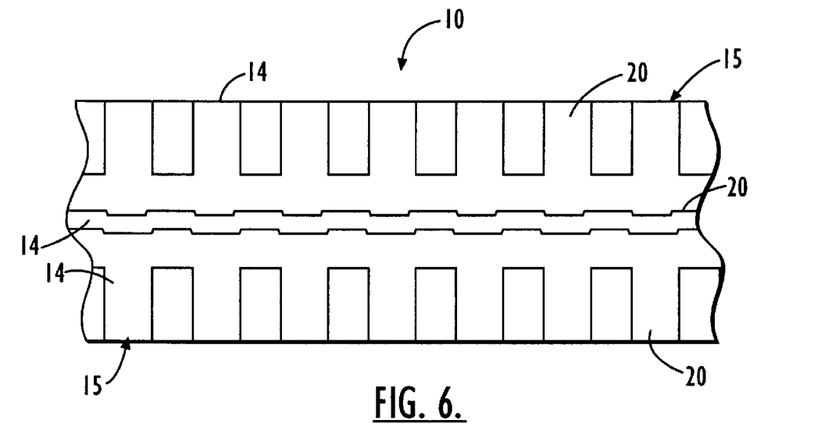
FIG. 6 is a side view of the four-flanged reinforcing member of FIG. 1 illustrating crimped or embossed edge portions of each flange.
Figure 7:
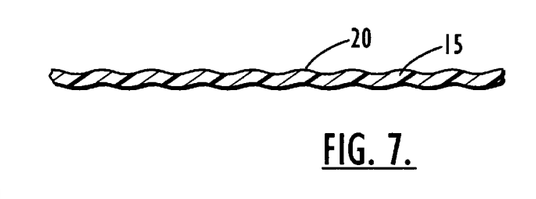
FIG. 7 illustrates a sinusoidal pattern for flange edge portions according to an embodiment of the present invention.

Referring now to FIG. 6, portions 20 of a flange 14 may have a non-planar surface as a result of crimping, embossing, and similar operations. In FIG. 6, the outer edge portions 20 of each flange have a generally crimped configuration near the outer edge 15 thereof. The non-planar flange surface increases adhesion of concrete to the reinforcing member flange 14. Flange strength is increased, as well. Those skilled in this art will appreciate that non-planar flange surfaces can take any number of configurations known to those skilled in this art to improve the mechanical bond between the reinforcing member 10 and a surrounding concrete structure. For example, FIG. 7 illustrates a sinusoidal pattern for flange edge portions according to another embodiment of the present invention.

In addition, edge portions of each flange may be sprayed with additional material to form a non-planar surface thereon for improving concrete adhesion thereto. Various types of materials may be utilized, including thermoplastic and thermosetting materials.

Figure 12:
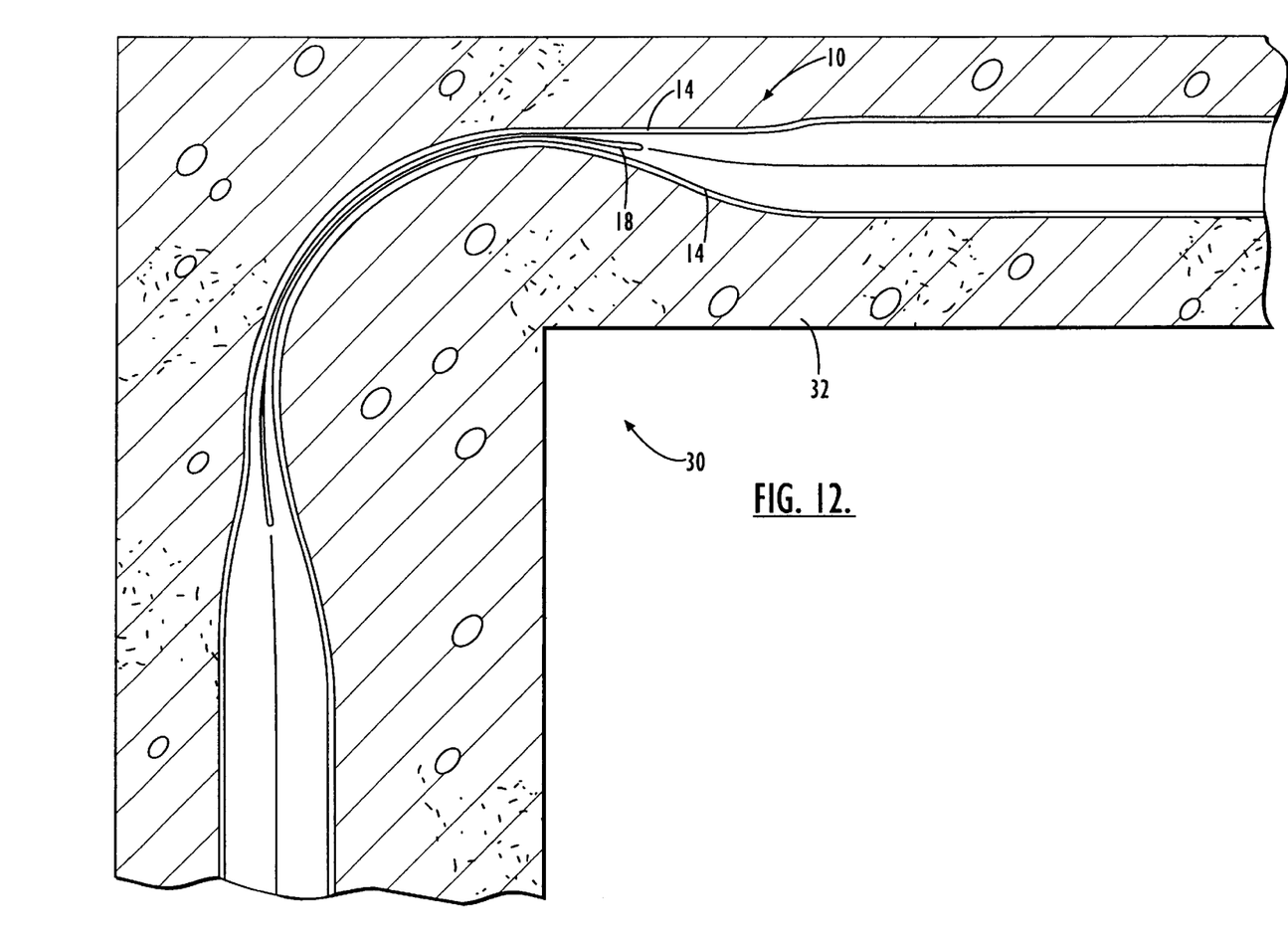
FIG. 12 is a side view of the bent four-flanged reinforcing member of FIG. 10 embedded in concrete.

Referring now to FIG. 12, a reinforced structure 30 according to aspects of the present invention is illustrated. The reinforced structure 30 contains a reinforcing member 10 surrounded by a mass of cementitious material 32. Exemplary cementitious materials include Portland cement, as well as sand, water and aggregate mixtures. The reinforcing member 10 is bent approximately 90° along the slot 18 to conform with the "L-shaped" reinforced structure 30.

Figures 13A, 13B, 14A:
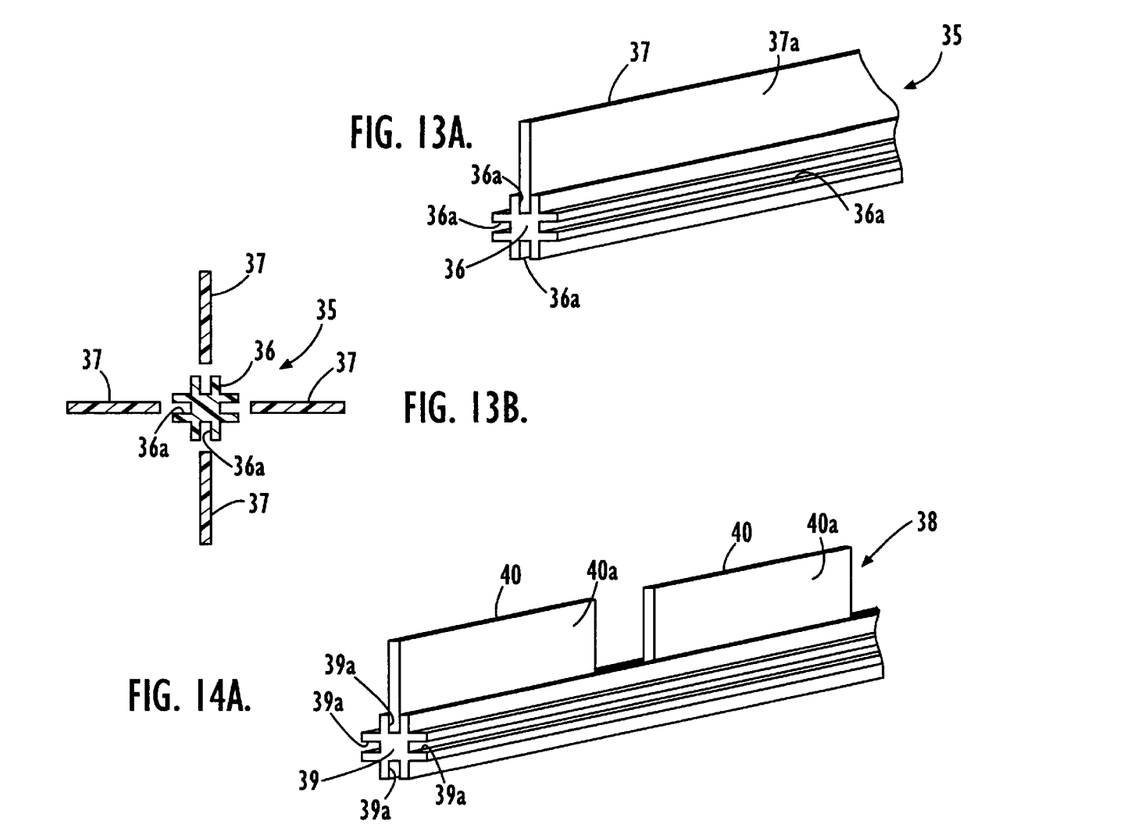
FIG. 13A is a perspective view of a reinforcing member having a central core with flanges connected thereto, according to an aspect of the present invention.
FIG. 13B is an exploded cross-sectional view of the reinforcing member of FIG. 13A.
FIG. 14A is a perspective view of a reinforcing member having a central core with flanges connected thereto and with gaps therebetween, according to an aspect of the present invention.

Referring now to FIGS. 13A–13B, a reinforcing member 35 having a central core member 36 and a plurality of flanges 37, according to another aspect of the present invention, is illustrated. The central core member 36 has a plurality of radially spaced slots 36a formed therein along the longitudinal direction thereof, as illustrated. These slots 36a serve as means for removably securing a plurality of flanges to the central core member 36. Various methods of securing the flanges 37 within the slots 36a, may be utilized without departing from the spirit and intent of the present invention. For example, the flanges 37 may snap or slide into the slots 36a, or may be held therein via adhesives and the like.

The flanges 37 and central core member 36 may be fabricated independently of each other and via various methods, including pultrusion methods described herein. Edge portions 37a of each flange 37 may be embossed or sprayed with additional material to form a non-planar surface thereon for improving concrete adhesion thereto.

It is to be understood that the present invention is not limited to the illustrated reinforcing member 35. The central core member 36 may have different configurations and may allow for different numbers of flanges to be secured thereto. It is preferred that the central core member 36 be formed of a thermoplastic material. Accordingly, heat can be added to the central core member 36 to facilitate bending the reinforcing member 35 to a desired configuration. When heat is removed, preferably the central core member 36 maintains its bent configuration. Accordingly, the need to secure the reinforcing member 35 in some manner to maintain the bent configuration is eliminated. Alternatively, portions of the flanges 37 and/or the central core member 36 may be removed, such as by grinding, to facilitate bending.

According to another aspect of the present invention, the central core member 36 may be formed of flexible material that can be bent without the need for heat. However, the central core member 36 may also be formed of other non-corrosive materials such as aluminum and polymeric materials.

Figure 14B:
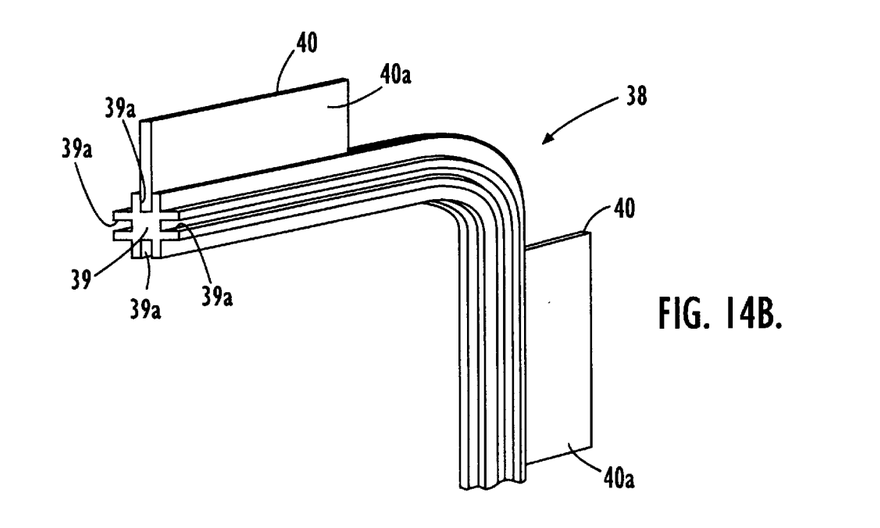
FIG. 14B illustrates the reinforcing member of FIG. 14A being bent at one of the gaps between the flanges.

Referring now to FIGS. 14A–14B, a reinforcing member 38 having a central core member 39 and a plurality of longitudinally spaced-apart flanges 40, according to another aspect of the present invention, is illustrated. The central core member 39 has a plurality of radially spaced slots 39a formed therein along the longitudinal direction thereof, as illustrated. These slots 39a serve as means for removably securing thereto a plurality of longitudinally spaced-apart flanges 40. As described above, various methods of securing the flanges 40 within the slots 39a, may be utilized without departing from the spirit and intent of the present invention. For example, the flanges may snap or slide into the slots 39a, or may be held therein via adhesives, mechanical anchors, and the like.

Because the flanges 40 are longitudinally separated to form gaps therebetween, the reinforcing member 38 can be bent at any of these gaps, as illustrated in FIG. 14B. Accordingly, slots within the central core member 39 are not required for the reinforcing member to bend. The flanges 40 do not fold down on themselves when the reinforcing member 38 is bent. Accordingly, more flange surface area is available for contact with concrete adjacent to each bend than with the slotted embodiment described above and illustrated in FIG. 12.

Another advantage of the embodiment illustrated in FIGS. 14A–14B is that reinforcing fibers are not exposed to corrosive environments. When a slot is formed within the central core member 12 of the reinforcing member 10 illustrated in FIG. 4, reinforcing fibers may be exposed as a result. When exposed to corrosive environments, these exposed fibers may degrade in strength, which may, in turn, lead to strength degradation of the reinforcing member.

Still referring to FIGS. 14A–14B, the flanges 40 and central core 39 may be fabricated independently of each other and via various methods, including pultrusion methods described herein. Edge portions 40a of each flange 40 may be embossed or sprayed with additional material to form a non-planar surface thereon for improving concrete adhesion thereto.

It is to be understood that the present invention is not limited to the illustrated configuration of the reinforcing member 38. The central core 39 may have different configurations and may allow for different numbers of flanges 40 to be secured thereto. It is preferred that the central core 39 be formed of a thermoplastic material. Accordingly, heat can be added to the central core 36 to bend the reinforcing member 38 to a desired configuration. When heat is removed, preferably the central core 39 maintains this configuration. Accordingly, the need to secure the reinforcing member in some manner to maintain the bent configuration is eliminated. According to another aspect of the present invention, the central core 39 may be formed of flexible material that can be bent without the need for heat, such as aluminum, polymeric materials, and the like.

The present invention also anticipates that the flanges and/or central core of each reinforcing member embodiment described above may include various types of connectors for connecting multiple reinforcing members together. Accordingly, multiple reinforcing members can be secured together to form various structures. Conventional rebar is often secured together via wire ties and the like, which can be rather labor intensive. The present invention allows multiple reinforcing members to be assembled together quickly and easily, without the need for conventional securing methods.

Figure 15:
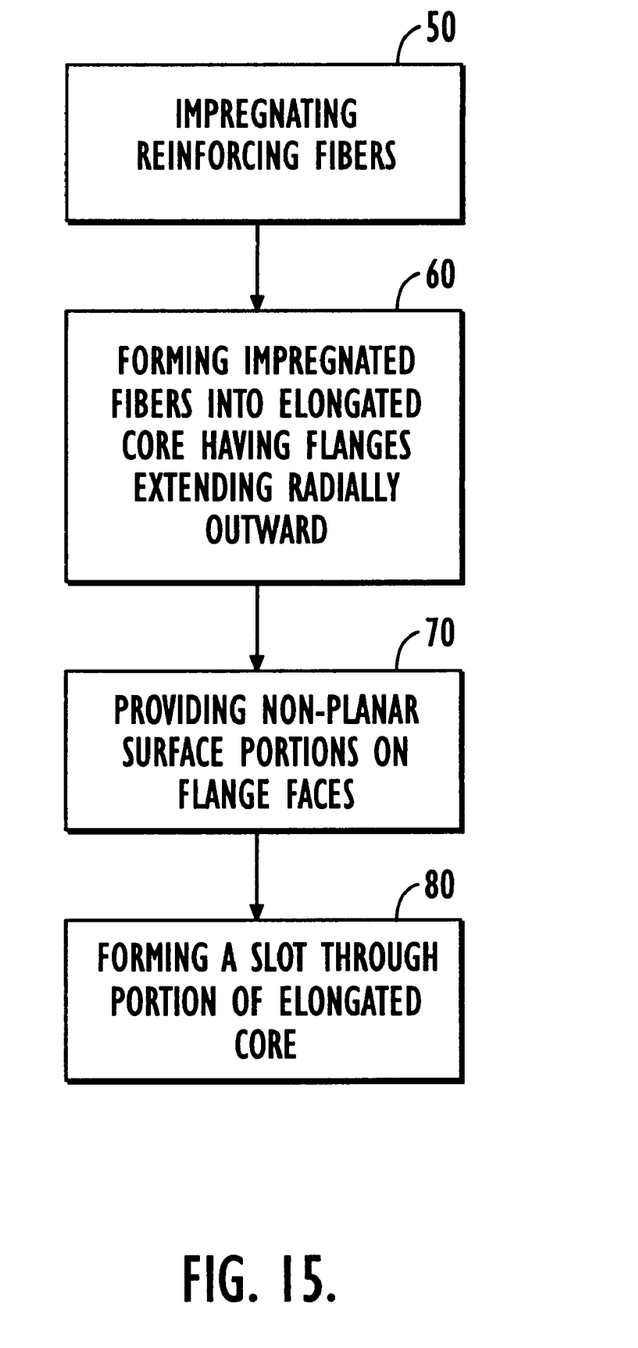
FIG. 15 schematically illustrates operations for manufacturing composite reinforcing member according to the present invention.

Referring now to FIG. 15, operations for fabricating reinforcing members according to the present invention are illustrated. In general, fabrication operations include: impregnating reinforcing fibers by pultruding the reinforcing fibers through a bath of resin material (Block 50); forming the impregnated reinforcing fibers into an elongated core having a plurality of elongated flanges extending radially outward therefrom (Block 60); embossing portions of one or more flange faces to provide a non-planar surface portion thereon (Block 70); and forming a slot through a portion of the elongated core such that each of the flanges has a free inner edge adjacent the slot (Block 80).

Conventional pultrusion processes involve drawing a bundle of reinforcing material (e.g., glass filaments or fibers) from a source thereof, wetting the fibers and impregnating them (preferably with a thermosettable polymer resin) by passing the reinforcing material through a resin bath in an open tank, pulling the resin-wetted and impregnated bundle through a shaping die to align the fiber bundle and to manipulate it into the proper cross-sectional configuration, and curing the resin in a die mold while maintaining tension on the filaments. Because the fibers progress completely through the pultrusion process without being cut or chopped, the resulting products generally have exceptionally high tensile strength in the longitudinal (i.e., in the direction the filaments are pulled) direction. Exemplary pultrusion techniques are described in U.S. Pat. Nos. 3,793,108 to Goldsworthy; 4,394,338 to Fuway; 4,445,957 to Harvey; and 5,174,844 to Tong, the disclosures of which are incorporated herein by reference in their entirety.

Figure 16:
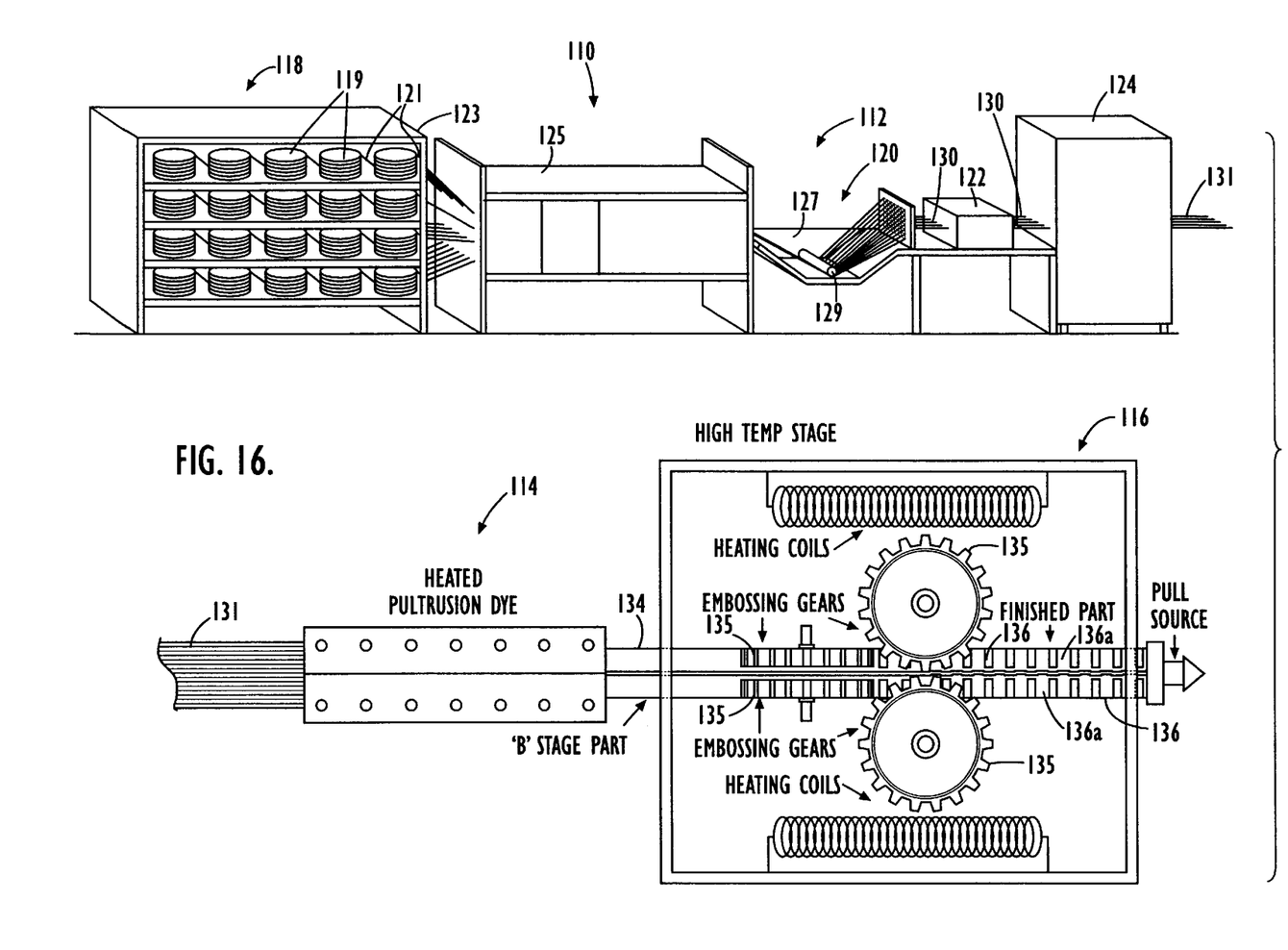
FIG. 16 illustrates an apparatus for fabricating composite reinforcing member according to the present invention.

A particularly preferable apparatus for fabricating reinforcing members according to the present invention is illustrated in FIG. 16. The apparatus 110 includes a reinforcing fiber feed station 112, a shaping die 114, and a finishing station 116.

Reinforcing Fiber Feed Station

The reinforcing fiber feed station 112 generally includes a reinforcing material supply 118, a bath 120 of a thermosetting resin 127, a forming station 122, and a preheating station 124. The illustrated reinforcing material supply 118 includes multiple spools 119 of reinforcing fibers 121 mounted within a creel 123. The creel 123 may include virtually any number of spools 119. Creels including 100 or more spools are common. Preferably, the reinforcing fibers 121 are drawn from the spools 119 through a series of ceramic bushings (not shown) positioned at the front of the creel 123 to maintain alignment and reduce breakage of the reinforcing fibers 121.

From the creel 123, the reinforcing fibers 121 are guided via a creel guide or card 125 to the bath 120 (shown in sectional view) of an unsaturated polyester resin or other thermosetting resin 127 such as vinyl ester resins, polyurethanes, epoxies, and phenolics. The creel guide 125 controls alignment to prevent twisting, knotting or any other damage to the reinforcing fibers 121. The reinforcing fibers 121 are directed under an impregnating roll(s) or bar(s) 129 (i.e., a so-called "wet-out bar"), which submerges the reinforcing fibers in the bath 120 and impregnates them. This type of bath is sometimes referred to as a "dip bath."

Alternatively, the reinforcing fibers 121 may be impregnated with thermosetting resin 127 via an apparatus that injects the thermosetting resin onto the reinforcing fibers. Such injection apparatus are known to those skilled in the art, as are other means for impregnating the reinforcing fibers 121.

After impregnation, the impregnated fibers (designated 130 in FIG. 16) may be formed into a particular alignment at forming station 122, prior to entering the shaping die 114. A forming station 122 is preferably included to ensure positive alignment of the impregnated reinforcing fibers 130 relative to the shaping die 114. As is known to those skilled in the art, various guide slots, holes, and clearances of the forming station 122 must be sized to prevent excess tension on the wet reinforcing fibers, but also must permit sufficient resin removal to prevent viscous drag on the reinforcing fibers 130 at the entrance of the shaping die 114 from being too high.

After the forming station 122, the impregnated reinforcing fibers 130 are preferably preheated prior to entering the shaping die 144 in a suitable heating unit 124. As is know to those skilled in the art, conventional ovens, as well as infrared, microwave, and radio frequency devices may be utilized to preheat the impregnated reinforcing fibers 130. Preferably, the impregnated reinforcing fibers 130 are uniformly heated throughout their cross-section to reduce the duration that the reinforcing fibers must remain in the shaping die 114. Preheating may also enable thick sections of reinforcing member to be manufactured without large thermal stresses being created therein due to uneven heat distribution.

Shaping Die

Figure 5:
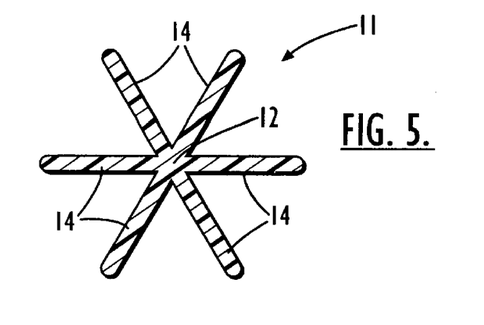
FIG. 5 is a cross-sectional view of a six-flanged reinforcing member according to another embodiment of the present invention.

The preheated impregnated reinforcing fibers (designated as 131 in FIG. 16) then proceed to the shaping die 114 to be formed into reinforcing member. Additional resin material 127 to improve corrosion resistance, add color, provide ultra violet radiation protection, and the like, may be added at a station 132 at the entrance to the shaping die 114. As the resin material 127 and reinforcing fibers 131 travel through the shaping die 114, a reinforcing member having a cross-sectional shape corresponding to the die profile is formed. Exemplary cross-sectional shapes are illustrated in FIGS. 2, 3, and 5, described above. The shaping die 114 is also preferably heated. Thus, as the resin material 127 and impregnated reinforcing fibers 131 proceed through the shaping die 114, the resin reacts under the heat and pressure generated by the shaping die, and partially cures.

A number of different methods can be used to position and anchor the shaping die 114 and to apply the heat necessary to initiate the curing reaction of the resin 127. The use of a stationary die frame with a yoke arrangement that allows the shaping die 114 to be fastened to the frame is the simplest arrangement. In all die-holding designs, the drag force that develops as material is pulled through the shaping die 114 must be transferred to the frame without causing movement of the shaping die or frame deflection. With a yoke arrangement, heating jackets that employ hot oil or electrical resistance strip heaters are positioned around the shaping die 114 at desired locations. Thermocouples are also placed in the shaping die 114 to control the level of heat applied. Multiple individually-controlled zones can be configured in this manner. This approach is well suited to single cavity set-ups, but becomes more complex when the number of shaping dies used simultaneously increase, as each shaping die requires its own heat source and thermocouple feedback device. Standard heating jackets and heating plates designed to accommodate multiple shaping dies can be used to help alleviate this limitation.

Another popular shaping die station configuration uses heated platens that have fixed zones of heating control with thermocouple feedback from within the platen. The advantage of this method is that all dies can be heated uniformly with reduced-temperature cycling, because changes in temperature are detected early at the source of the heat rather than at the load. However, a temperature offset will be common between the platen set point and the actual shaping die temperature. With knowledge of the differential, an appropriate set point can be established. The advantage of quick set-up and replacement of shaping dies stemming from the use of heated platens can lead to increased productivity through reduced down-time, particularly when means for separating the platens automatically is provided.

A source of cooling water or air should be included in the front of the shaping die 114 at start-up and during temporary shutdown periods to prevent premature gelation of the resin 127. This can be accomplished by using either a jacket or a self-contained zone within the heating platen. Alternatively, the first section of the shaping die 114 is can be unheated, and cooling can be accomplished through convection.

A particularly important pultrusion process control parameter is the heating profile of the shaping die 114 because it determines the rate of the thermosetting reaction, the position of the reaction within the shaping die, and the magnitude of the peak exotherm. Improperly cured resin may exhibit poor physical and mechanical properties, yet may appear identical to adequately cured resin. Excess heat input may result in thermal cracks or crazes, which may destroy the electrical resistance, corrosion resistance, and mechanical properties of the reinforcing member. Heat-sinking zones at the end of the shaping die 114 or auxiliary cooling may be necessary to remove heat prior to the exit of the reinforcing member 10 from the shaping die.

Finishing Station

Still referring to FIG. 16, the resin 127 of a formed reinforcing member 134 exiting from the shaping die 114 is in a "B" stage. Accordingly, the reinforcing member 134 is in a malleable state as it enters the finishing station 116. In the finishing station 116, embossing gears or rollers 135 form a non-planar pattern on outer edge portions 136a of each flange 136, as illustrated. As described above, the outer edge portions of each flange may have various patterns and shapes. In addition, the embossing gears or rollers 135 may also be utilized to pull the reinforcing member 134 through the pultrusion apparatus 110.

Methods of fabricating reinforcing members according to the present invention are advantageous because pultrusion can be performed at high rates of speed. Depending on thickness of a reinforcing member, production speeds of between 1 and 10 feet per minute may be achieved via the present invention.

Reinforcing Member Resin Materials

The resin 127 used to form reinforcing members according to the present invention is preferably a thermosetting resin. The term "thermosetting" as used herein refers to resins which irreversibly solidify or "set" when completely cured. Suitable thermosetting resins include unsaturated polyester resins, phenolic resins, vinyl ester resins, polyurethanes, and the like, and mixtures and blends thereof. Particularly preferred thermosetting resins are ATLAC™ 31727-00 and POLYLITE™ 31041-00, available from Reichhold Chemicals, Inc., Research Triangle Park, N.C.

Additionally, the thermosetting resins useful in the present invention may be mixed or supplemented with other thermosetting or thermoplastic resins. Exemplary supplementary thermosetting resins include epoxies. Exemplary thermoplastic resins include polyvinylacetate, styrene-butadiene copolymers, polymethylmethacrylate, polystyrene, cellulose acetatebutyrate, saturated polyesters, urethane-extended saturated polyesters, methacrylate copolymers, polyethylene terephthalate (PET), and the like in a manner known to one skilled in the art.

Unsaturated polyester, phenolic and vinyl ester resins are the preferred thermosetting resins of the present invention, such as described in U.S. Pat. No. 5,650,109 to Kaiser et al., the disclosure of which is incorporated herein by reference in its entirety. Suitable unsaturated polyester resins include practically any esterification product of a polybasic organic acid or anhydride and a polyhydric alcohol, wherein either the acid or the alcohol, or both, provide the reactive ethylenic unsaturation. Typical unsaturated polyesters are those thermosetting resins made from the esterification of a polyhydric alcohol with an ethylenically unsaturated polycarboxylic acid. Examples of useful ethylenically unsaturated polycarboxylic acids include maleic acid, fumaric acid, itaconic acid, dihydromuconic acid and halo and alkyl derivatives of such acids and anhydrides, and mixtures thereof. Exemplary polyhydric alcohols include saturated polyhydric alcohols such as ethylene glycol, 1,3-propanediol, propylene glycol, 1,3-butanediol, 1,4-butanediol, 2-ethylbutane-1,4-diol, 1,5-pentanediol, 1,6-hexanediol, 1,7-heptanediol, 1,8-octanediol, 1,4-cyclohexanediol, 1,4-dimethylolcyclohexane, 2,2-diethylpropane-1,3-diol, 2,2-diethylbutane-1,3-diol, 3-methylpentane-1,4-diol, 2,2-dimethylpropane-1,3-diol, 4,5-nonanediol, diethylene glycol, triethylene glycol, dipropylene glycol, glycerol, pentaerythritol, erythritol, sorbitol, mannitol, 1,1,1-trimethylolpropane, trimethylolethane, hydrogenated bisphenol-A and the reaction products of bisphenol-A with ethylene or propylene oxide.

The reinforcing member resin 127 can be formed by the addition of recycled PET, such as from soda bottles to the base resin prior to polymerization. PET bottles can be ground and depolymerized in the presence of a glycol, which produces an oligomer. The oligomer can then be added to a polymerization mixture containing polyester monomer and polymerized with such monomer to an unsaturated polyester.

Unsaturated polyester resins can also be derived from the esterification of saturated polycarboxylic acid or anhydride with an unsaturated polyhydric alcohol. Exemplary saturated polycarboxylic acids include oxalic acid, malonic acid, succinic acid, methylsuccinic acid, 2,2-dimethylsuccinic acid, 2,3-dimethylsuccinic acid, hydroxylsuccinic acid, glutaric acid, 2-methylglutaric acid, 3-methylglutaric acid, 2,2-dimethylglutaric acid, 3,3-dimethylglutaric acid, 3,3-diethylglutaric acid, adipic acid, pimelic acid, suberic acid, azelaic acid, sebacic acid, phthalic acid, isophthalic acid, terephthalic acid, tetrachlorophthalic acid, tetrabromophthalic acid, tetrahydrophthalic acid, 1,2-hexahydrophthalic acid, 1,3-hexahydrophthalic acid, 1,4-hexahydrophthalic acid, 1,1-cyclobutanedicarboxylic acid and trans-1,4-cyclohexanedicarboxylic acid.

Unsaturated polyhydric alcohols which are suitable for reacting with the saturated polycarboxylic acids include ethylenic unsaturation-containing analogs of the above saturated alcohols (e.g.,2-butene-1,4-diol).

Suitable phenolic resins include practically any reaction product of a aromatic alcohol with an aldehyde. Exemplary aromatic alcohols include phenol, orthocresol, metacresol, paracresol, Bisphenol A, p-phenylphenol, p-tert-butylphenol, p-tert-amylphenol, p-tert-octylphenol and p-nonylphenol. Exemplary aldehydes include formaldehyde, acetaldehyde, propionaldehyde, phenylacetaldehyde, and benzaldehyde. Particularly preferred are the phenolic resins prepared by the reaction of phenol with formaldehyde.

Suitable vinyl ester resins include practically any reaction product of an unsaturated polycarboxylic acid or anhydride with an epoxy resin. Exemplary acids and anhydrides include (meth)acrylic acid or anhydride, α-phenylacrylic acid, α-chloroacrylic acid, crotonic acid, mono-methyl and mono-ethyl esters of maleic acid or fumaric acid, vinyl acetic acid, cinnamic acid, and the like. Epoxy resins which are useful in the preparation of the polyvinyl ester are well known and commercially available. Exemplary epoxies include virtually any reaction product of a polyfunctional halohydrin, such as epichlorohydrin, with a phenol or polyhydric phenol. Suitable phenols or polyhydric phenols include for example, resorcinol, tetraphenol ethane, and various bisphenols such as Bisphenol-A, 4,4'-dihydroxydiphenylsulfone, 4,4'-dihydroxy biphenyl, 4,4'-dihydroxydiphenylmethane, 2,2'-dihydroxydiphenyloxide, and the like.

Typically, the resin 127 also includes a vinyl monomer in which the thermosetting resin is solubilized. Suitable vinyl monomers include styrene, vinyl toluene, methyl methacrylate, p-methyl styrene, divinyl benzene, diallyl phthalate and the like. Styrene is the preferred vinyl monomer for solubilizing unsaturated polyester or vinyl ester resins.

The thermosetting resin 127 may be thickened (or B-staged) during the manufacturing process of the reinforcing members. The thickening can occur before, during, or after passing through the shaping die 114. The term "thickened" as used herein relates to an increase in viscosity of the resin 127 such that the resin is transformed from a liquid to a nondripping paste form. This is often achieved by partial curing or so-called "B-staging" the resin. The term "partial curing" as used herein refers to incompletely polymerizing the resin 127 by initiating polymerization and subsequently arresting the polymerization or controlling the polymerization so that full cure occurs at a later time.

Thickening or partial curing is achieved in a variety of ways. For example, the thermosetting resin 127 may be thickened by the inclusion of a thickening agent. Suitable thickening agents are commonly known to those skilled in the art and include crystalline unsaturated polyesters, polyurethanes, alkali earth metal oxides and hydroxides, and polyureas. Often, the thickening agent cooperates with the conditions within a shaping fixture (such as the shaping die 114) to thicken or partially cure the thermosetting resin 127. The conditions within the fixture which are required to effect the thickening or partial cure of the thermosetting resin are dependent upon the thickening agent employed, and are discussed in detail below.

Suitable resins employing a crystalline polyester thickening agent are described in U.S. Pat. No. 3,959,209 to Lake, the disclosure of which is incorporated herein by reference in its entirety. Typically, in an embodiment of the present invention wherein the thermosetting resin 127 is thickened with a crystalline polyester, the thermosetting resin comprises a thermosetting resin solubilized in a vinyl monomer. The crystalline polyesters useful in the present invention are generally ethylenically unsaturated, and react with the vinyl monomer, although one skilled in the art will appreciate that saturated crystalline polyesters may also be employed.

Methods of preparing crystalline polyester are well known in the art and include polyesterifying a symmetrical, aliphatic diol with fumaric acid, lower alkyl esters of fumaric acid, or symmetrical saturated diacids such as terephthalic acid, isophthalic acid and sebacic acid. Maleic anhydride or maleic acid or lower alkyl esters of maleic acid may also be used in the presence of an appropriate catalyst. Likewise, mixtures of fumaric acid or esters with maleic anhydride or maleic acid or its esters may also be used. Exemplary crystalline polyesters which may be employed in the present invention include polyfumarates of 1,6-hexanediol, neopentyl glycol, bis-(hydroxyethyl)resorcinol, ethylene glycol, 1,4-butanediol, 1,4-cyclohexanediol, 1,4-cyclohexanedimethanol, or bis-(hydroxyethyl) hydroquinone.

The amount of crystalline polyester added to the thermosetting resin 127 will vary depending upon the particular thermosetting resin employed. Typically, about 2 to about 80 percent by weight of crystalline polyester is required to thicken about 20 to about 98 percent by weight of a thermosetting resin.

The thermosetting resin 127 may also be thickened with polyurethanes. Exemplary thermosetting resin thickened with a polyurethane are described in U.S. Pat. No. 3,886,229 to Hutchinson, the disclosure of which is incorporated herein by reference in its entirety. Typically, in the embodiment of the invention wherein the thermosetting resin is thickened with a polyurethane, the first resin material comprises a thermosetting resin solubilized in a vinyl monomer.

The polyurethanes useful in the present invention typically comprise the reaction product of a polyol and an isocyanate compound. The polyol may be saturated or unsaturated. Exemplary saturated polyols include ethylene glycol, propylene glycol, butane-1,4-diol, pentane-1,5-diol, hexane-1,6-diol, di(ethylene glycol), and di(propylene glycol). Polymers of glycols may also be employed. Exemplary polymers include poly(ethylene glycol), poly (propylene glycol), and poly(butylene glycol) and polyols of functionality greater than two, for example, glycerol, pentaerythritol, and trialkylol alkanes, e.g., trimethylol propane, triethylol propane, tributylol propane and oxyalkylated derivatives of said trialkylol alkanes, e.g., oxyethylated trimethylol propane and oxypropylated trimethylol propane.

In an embodiment wherein the thermosetting resin 127 is thickened with a polyurethane including an unsaturated polyol, the unsaturated polyol crosslinks the urethane groups with the ethylenically unsaturated polyester and vinyl monomer of the thermosetting resin. Exemplary unsaturated polyols include polyesters, and vinyl esters. In one particularly preferred embodiment, the unsaturated polyol is a diester of propoxylated bisphenol-A.

The isocyanate compound employed to produce a polyurethane thicknering agent is typically a polyisocyanate. The polyisocyanate may be aliphatic, cycloaliphatic or aromatic or may contain in the same polyisocyanate molecule aliphatic and aromatic isocyanate groups, aliphatic and cycloaliphatic isocyanate groups, aliphatic cycloaliphatic and aromatic isocyanate groups or mixtures of any two or more polyisocyanates.

Exemplary polyisocyanates include 4,4'-diphenylmethane diisocyanate, 2,4-toluene diisocyanate, 2,6-toluene diisocyanate, isophorone diisocyanates (e.g., 3-isocyanatomethyl-3,5,5-trimethylcyclohexyl isocyanate), tetramethylene diisocyanate, pentamethylene diisocyanate, hexamethylene diisocyanate and octamethylene diisocyanate, and cycloaliphatic diisocyanates (e.g., 4,4'-dicyclohexylmethane diisocyanate).

The polyurethane may be reacted with the thermosetting resin 127 according to any method known to those skilled in the art. The amount of polyurethane added to the first resin material will vary depending upon the particular thermosetting resin employed. Typically, the polyurethane comprises about 1 to about 60 percent by weight of the thermosetting resin.

The resin 127 may also be thickened using a polyurea thickening agent. Suitable formulation of resins thickened with polyurea are described in U.S. Pat. No. 4,296,020 to Magrans, Jr., the disclosure of which is incorporated herein by reference in its entirety. Typically, in the embodiment of the invention wherein the resin material is thickened with polyurea, the resin material comprises a resin solubilized in a vinyl monomer. The polyureas useful in the present invention typically comprise the product of polyamines with polyisocyanates. The polyisocyanates useful in the present invention include those described above with reference to urethane thickeners. Aliphatic, cycloaliphatic and aromatic polyamines free of ethylenic saturation are preferred polyurea precursors in that they form individual polyurea chains which are relatively cross-linked with the polymer chain formed by the copolymerization of the ethylenically unsaturated resin and monomers in solution therewith.

Aryl diamines and mixtures thereof such as metaphenylene diamine, paraphenylene diamine, naphthalene diamine, benzidene, bis(4-aminophenyl)methane, 4,4'-diaminodiphenyl sulfone and halogenated derivatives such as those containing halogen on the benzenoid ring such as 3,3'-dichlorobenzidine, bis,4-amino-2-chlorophenyl (sulfone), 4-bromo-1,3-phenylene diamine, to name a few, are operable.

Low molecular weight aliphatic and cycloaliphatic diamines are also suitably employed, such as: ethylene diamine, propylene diamine, hexamethylene diamine, trimethyl hexamethylene diamine, isophorone diamine, 1-amino-3-amino-3,5,5-trimethyl cyclohexane, hydrogenated di-(aminophenyl)methane, hydrogenated methylene dianiline, diamino methane, and hydrogenated toluene diamine. The most useful of these are those that are liquids up to 75EC. For those which are solids under these conditions, vinyl monomer solutions can be employed to form the homogeneous mix rapidly. In addition, other suitable amines include polyoxyalklene polyamines and cyanoalkylated polyoxyalklene polyamines having a molecular weight of about 190 to about 2,000 with a preferred range of about 190 to about 1,000. These amines are prepared according to the procedure outlined in a U.S. Pat. No. 4,296,020 to Magrans, Jr., the disclosure of which is hereby incorporated by reference in its entirety.

The resin 127 may also be thickened using alkali earth metal oxides or hydroxides. Typical thickeners of this type include calcium and magnesium oxides or hydroxides. The addition of these components to the resin 127 will transform the liquid thermosetting resin to a semi-solid or solid form. The amount of oxide or hydroxide employed will vary depending upon the particular thermosetting resin 127 employed. Typically, the alkali metal oxide or hydroxide comprises about 1 to about 15 percent by weight of the first resin material.

The resin 127 also may include an initiator system which cooperates with the conditions of the shaping die 114 to thicken the resin by partially curing the resin. The initiator system may be present in addition to any of the foregoing thickening agents, or as an alternative thereto.

The initiator system may comprise any number of polymerization initiators. Where multiple polymerization initiators are employed, the initiator system typically comprises polymerization initiators which can be activated by different conditions. For simplicity, where multiple polymerization initiators are employed, we refer to the polymerization initiator requiring the least activation energy as the "first polymerization initiator", and the initiator requiring the most activation energy as the "second polymerization initiator". Any practical number of polymerization initiators having activation energies between the first and second polymerization initiators may also be incorporated into the thermosetting resin matrix. It should not be implied from the use of the terms "first" and "second" polymerization initiator that the invention is restricted to the use of no more than two polymerization initiators.

Polymerization initiators which are useful in the practice of the present invention typically include free-radical initiators. Typical free-radical initiators include peroxy initiators. The reactivity of such initiators is evaluated in terms of the 10 hour half-life temperature, that is, the temperature at which the half-life of a peroxide is 10 hours. Suitable first polymerization initiators include polymerization initiators having a low 10 hour half-life, i.e., a more reactive peroxide initiator, as compared to initiators having a higher 10 hour half-life. Suitable second polymerization initiators include polymerization initiators having a higher 10 hour half-life than the 10 hour half-life of the polymerization initiator selected as the first polymerization initiator. Exemplary free-radical initiators useful in the present invention include diacyl peroxides, (e.g., lauroyl peroxide and benzoyl peroxide), dialkylperoxydicarbonates, (e.g., di(4-tert-butylcyclohexyl) peroxy dicarbonate), tert-alkyl peroxyesters, (e.g., t-butyl perbenzoate), di-(tert-alkyl) peroxyketals, (e.g., 1,1-di-(t-amylperoxy)cyclohexane), di-tert-alkyl peroxides, (e.g., dicumyl peroxide), azo initiators, (e.g., 2,2'-azobis(isobutyronitrile), ketone peroxides, (e.g., methylethylketone peroxide and hydroperoxides).

In an embodiment wherein the initiator system comprises only one polymerization initiator, the resin material preferably includes a vinyl monomer. The vinyl monomer and the polymerization initiator may be independently activated under different conditions thus permitting the partial polymerization of the resin 127.

The amount of polymerization initiator(s) used is dependent upon the number of initiators employed, the conditions at which the selected initiators will initiate polymerization, and the time desired for partial curing. Typically the amount of time desired for partial curing is a short period, i.e., less than 3 hours, and often less than 1 hour. In the embodiment wherein the resin 127 includes only one polymerization initiator, the amount of the initiator is typically about 0.1 to about 10 percent by weight of the resin. In the embodiment wherein the resin 127 includes two polymerization initiators, the amount used is about 0.01 to about 4 percent by weight of the first polymerization initiator and about 0 to about 5 percent by weight of the second polymerization initiator based on the weight of the resin 127.

The initiator system and amounts of each polymerization initiator incorporated into the resin 127 should be such that as the resin impregnated reinforcing fibers 131 are shaped in the shaping die 114, the conditions therein are sufficient to activate at least one, but preferably not all polymerization initiators, resulting in the partial polymerization of the resin 127. Typically, in the embodiment wherein the initiator system comprises only one polymerization initiator, the resin impregnated reinforcing fibers 131 are shaped through a shaping die 114 within which the reinforcing fibers 131 are subjected to sufficient heat to activate the polymerization initiator without attaining the self-polymerization temperature of the resin 127. In an embodiment wherein multiple polymerization initiators are employed, typically the resin impregnated reinforcing fibers 131 are shaped in the shaping die 114 within which the reinforcing fibers are subjected to sufficient heat to activate at least one, and preferably the first, polymerization initiator to partially cure the resin 127.

The resin 127 may also include other additives commonly employed in resin compositions, the selection of which will be within the skill of one in the art. For example, the resin material may include reinforcing fillers, particulate fillers, selective reinforcements, thickeners, initiators, mold release agents, catalysts, pigments, flame retardants, and the like, in amounts commonly known to those skilled in the art. Any initiator may be a high or a low temperature polymerization initiator, or in certain applications, both may be employed. Catalysts are typically required in resin compositions thickened with polyurethane. The catalyst promotes the polymerization of NCO groups with OH groups. Suitable catalysts include dibutyl tin dilaurate and stannous octoate. Other commonly known additives which may desirably be incorporated into the resin material include pigments and flame retardants.

Particulate fillers that can be used with the resin 127 include inorganic fillers and organic fillers. Exemplary inorganic fillers include ceramic, glass, carbon-based inorganic materials such as carbon black, graphite, and carbonoyl iron, cermet, calcium carbonate, aluminum oxide, silicon dioxide, oxides of nickel, cobalt, iron (ferric and ferrous), manganese, and titanium, perlite, talc (hydrous magnesium silicate), mica, kaolinite, nitrides of boron and aluminum, carbides of silicon, boron, and aluminum, zircon, quartz glass, aluminum hydroxide, gypsum, magnesite, ferrite, molybdinum disulfide, zinc carbonate, and blends thereof. Exemplary organic fillers include aramid and polyethylene terephthalete. These and other exemplary reinforcing materials are described in U.S. Pat. Nos. 4,278,780 to Nishikawa et al.; 4,358,522 to Shinohara et al.; 5,011,872 to Latham et al.; 5,234,590 to Etienne et al.; and 4,947,190 to Murayama et al. Preferably, the resin 127 includes a ceramic filler; i.e., a material that is the product of heated earthy raw materials in which silicon with its oxide and silicates, such as calcium silicate, wollastonite, beryl, mica, talc, and clays such as kaolinite, occupy a predominant position. See *Hawley's Condensed Chemical Dictionary* at 240 (11th ed. 1987). A particularly preferred ceramic filler is KZ Ceramic Powder, a proprietary ceramic powder available from Ceramic Technologies Corporation, Rowley, Iowa. In one embodiment, the ceramic filler is advantageously blended with a calcium carbonate filler in a 3:1 blend. The filler can be supplied in many forms, including powder, fiber, sphere, bead, particle, flake, lamella, and the like.

Reinforcing Fibers

The reinforcing fibers 130, which are impregnated with the resin 127, can comprise up to 75 percent fibers, and preferably comprise at least between about 40 percent and about 70 percent of the reinforcing member 134 by weight. The reinforcing fibers 130 are preferably glass fibers. Glass fibers are readily available and low in cost. A typical glass fiber is electrical grade E-glass. E-glass fibers have a tensile strength of approximately 3450 MPa (practical). Higher tensile strengths can be accomplished with S-glass fibers having a tensile strength of approximately 4600 MPa (practical). The glass fiber can be treated to provide other properties such as corrosion resistance. Other suitable reinforcing fibers include carbon, metal, high modulus organic fibers (e.g., aromatic polyamides, polybenzimidazoles, and aromatic polyimides), and other organic fibers (e.g., polyethylene, liquid crystal and nylon). Blends and hybrids of the various fibers can be used.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A concrete reinforcing member comprising:

an elongated core defining a longitudinal direction, wherein said core is formed from resin material having a plurality of reinforcing fibers disposed therein;

a plurality of elongated flanges extending radially outward from said core, each flange having opposite faces terminating at an outer edge, wherein said elongated flanges are formed from fiber-reinforced resin material, and wherein at least one of said flange faces has a non-planar surface portion for improving concrete adhesion thereto, and at least one slot formed through a portion of said elongated core along said longitudinal direction such that each of said plurality of flanges has a free inner edge adjacent said at least one slot, wherein said concrete reinforcing member is bendable along said at least one slot in a direction transverse to said longitudinal direction.

2. A concrete reinforcing member according to claim 1 wherein said flanges are equidistantly spaced around said core.

3. A concrete reinforcing member according to claim 1 wherein said outer edge of each flange is substantially parallel with said longitudinal direction.

4. A concrete reinforcing member according to claim 1 wherein said reinforcing fibers are unidirectional along said longitudinal direction.

5. A concrete reinforcing member according to claim 4 wherein unidirectional reinforcing fibers are located along a surface of at least one of the elongated flanges.

6. A concrete reinforcing member according to claim 1 wherein said resin material is thermosetting resin.

7. A concrete reinforcing member according to claim 1 wherein said reinforcing fibers are selected from the group consisting of glass, carbon, metal, aromatic polyamides, polybenzimidazoles, aromatic polyimides, polyethylene, nylon, and blends and hybrids thereof.

8. A concrete reinforcing member according to claim 1 wherein said at least one slot comprises a plurality of slots spaced along said core.

* * * * *